Dec. 4, 1923. 1,476,052
J. I. COMLY
OVERHEAD CATENARY SUSPENSION CONSTRUCTION FOR TRANSMITTING
ELECTRICITY TO VEHICLES
Original Filed Oct. 7, 1916
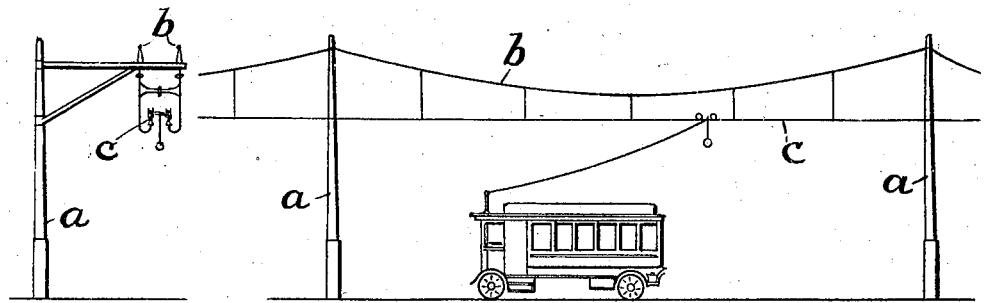
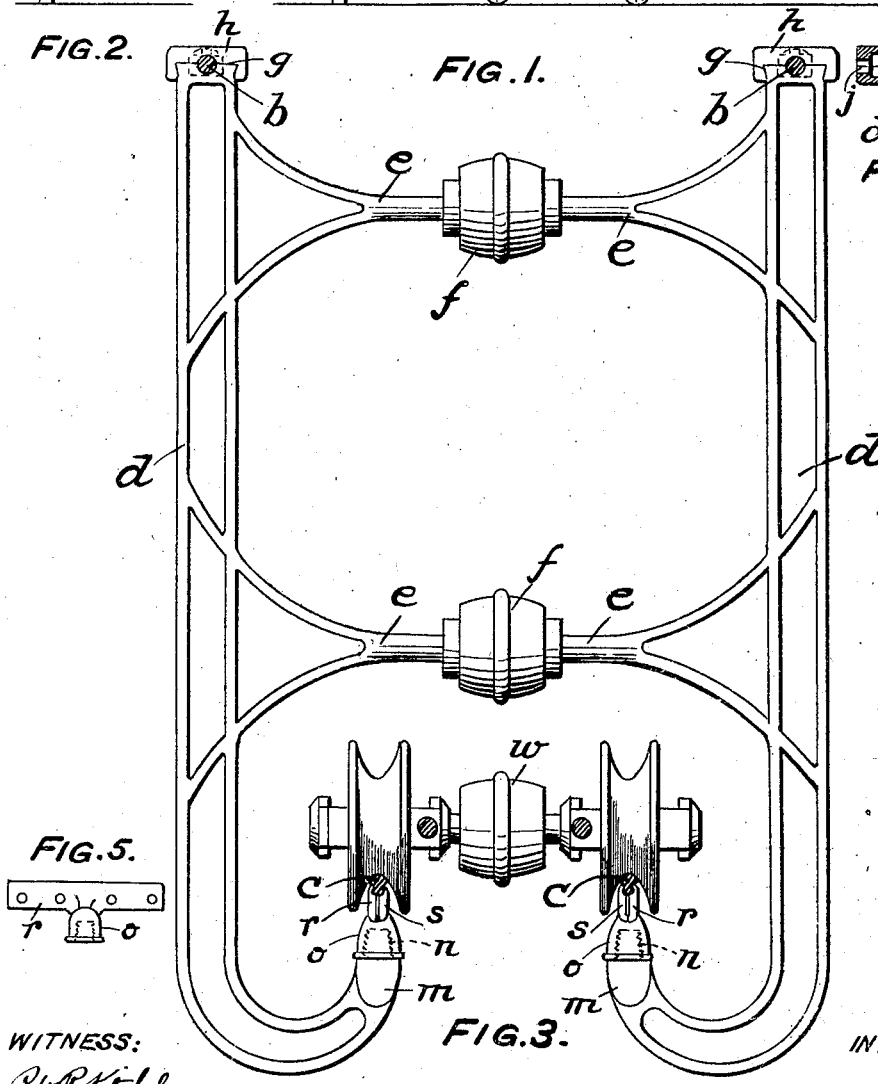
WITNESS:
Robt R Kitchel
INVENTOR
James I. Comly
BY Frank S Busser
ATTORNEY.

Patented Dec. 4, 1923.

1,476,052

UNITED STATES PATENT OFFICE.

JAMES I. COMLY, OF HARRISBURG, PENNSYLVANIA.

OVERHEAD CATENARY SUSPENSION CONSTRUCTION FOR TRANSMITTING ELECTRICITY TO VEHICLES.

Application filed October 7, 1916, Serial No. 124,229. Renewed April 30, 1923.

*To all whom it may concern:*

Be it known that I, JAMES I. COMLY, a citizen of the United States, residing at Harrisburg, county of Dauphin, and State of Pennsylvania, have invented a new and useful Improvement in Overhead Catenary Suspension Constructions for Transmitting Electricity to Vehicles, of which the following is a full, clear, and exact description, reference being had to the accompanying drawings, which form a part of this specification.

My invention relates to overhead wire construction for the transmission of electricity between the source of supply and moving apparatus used as a means of contact therewith for the purpose of diverting the electricity between the wires and moving vehicles.

It particularly relates to wire construction for the supplying of electric energy to electric motor omnibuses or vehicles which receive their power from overhead wires (sometimes termed "electric trolley omnibuses") which are not operated upon or guided by rails or tracks and consequently require a metallic circuit in the overhead wire construction which, when direct current is used, has two conductor wires each insulated from the other, a moving means of contact with both said conductor wires, and flexible connection between such movable means of contact and the vehicle which permits the vehicle to travel along the road on either side of, as well as directly under, the overhead wire construction without interfering with the contact with either of the overhead conductor wires; but my invention may be used in conjunction with electrically propelled vehicles which are operated on tracks.

The conditions to be met and the purpose of my invention may be more clearly explained by a brief description of the common method of operation of "electric trolley omnibuses."

The prevalent form of device in use in conjunction with "electric trolley omnibuses" to make moving contact simultaneously with two overhead conductor wires is a trolley carrier on a frame containing four rotatably mounted grooved trolley wheels two of which run along each of the overhead conductor wires. The trolley carrier is composed of two halves, each of which carries the two wheels which run upon the same wire. Those two halves are rigidly joined to each other by a cross piece containing a section of strain insulating material to prevent short circuiting. Another means of making moving contact with the two overhead conductor wires is by sliding contactors insulated between the distribution contact wires.

It is obvious, therefore, that, in order to insure simultaneous and continuous contact with both of the overhead conductor wires, it is necessary that they be maintained equidistant from each other throughout their entire length and practically level with each other at each point along the line.

To maintain those requisite conditions the recognized tendency of different wires of the same material, when of the character of metal used for conductors, to sag unevenly from change of temperature and from their own weight when used in spans of considerable length, must necessarily be reasonably controlled, and its disadvantageous effect practically overcome.

The appliance for moving contact is customarily operated as overrunning or underrunning. When underrunning it is held in position pressed against the wires by means of a trolley pole attached to the vehicle and swiveled at both ends to permit the vehicle to travel to one side of the line of overhead wires. When overrunning, a conductor wire from each of its halves, with insulated covering, is carried to the vehicle permitting it latitude of operation on the road while the appliance of contact moves along and remains upon the wires.

It is obvious, therefore, that the overhead wire construction is required at times to sustain more or less lateral pull from the vehicles.

The main object of my invention is to make an overhead wire construction for the transmission of electricity in which the conducting wires shall be held in uniform relationship with each other throughout their entire length to permit a regular and continuous contact with each of the conducting wires simultaneously by moving apparatus used as a means of diverting the electricity between the wires and the vehicles; and which shall be staunch and strong to sustain the weight of apparatus used for such contact (when the same shall be what is known as the overrunning trolleys) in addition to the weight of accumulations of ice and snow; and which, by reason of its form and construction, shall maintain an approximately rigid resistance to the tendency to sway from the force of wind or lateral pull from the vehicles when running to one side of the line of the overhead wire construction; and which at the same time shall minimize the tensile strain upon the conducting wires, minimize and equally distribute the sag therein and minimize their necessary size and cost.

A preferred embodiment of the invention is shown in the drawings, in which—

Fig. 1 is a diagrammatic side view of one of the longitudinal spans and portions of two similar spans of my improved construction. Fig. 2 is a cross-section thereof at the end of one of the longitudinal spans and point of support from the ground. Fig. 3 is a side view of one of the hangers. Fig. 4 is a section through the upper end of one bar of the hanger. Fig. 5 is a side view of the immediate support for the service wire.

The two messenger or catenary wires or cables $b$, $b$ extend between supports from poles $a$ and sustain the two trolley or service or distribution contact wires $c$, $c$ by means of the hangers hereinafter described. The construction of the hangers is such as to accomplish the objects sought and also to convey the electric current between the messenger wires and supported wires; it being understood that the current from the power house to and from the vehicle to be propelled passes through the messenger wires, hangers and supported wires, thereby, as in other catenary systems, permitting the employment of copper wire of relatively small cross-section for the suspended conductors. Ordinarily, the system involves the passage of the current from the source of electric energy to positive conductor wire and one messenger wire, and may pass from the messenger wire through the hangers to one supported conductor wire, thence through a trolley wheel or wheels and conductor to one pole of the motor carried by the vehicle, thence from the other pole of the motor carried by the vehicle, through another conductor and trolley wheel to the other supported conductor wire, and thence as well as through the hangers and other messenger wire to the source of electric energy. My invention contemplates the employment of this system, but it is also equally adaptable to the system in which the hangers are so constructed that one conductor wire is insulated from the other wires so that the current from the source passes through the other supported conductor wire and both messenger wires while the return circuit is made through the other supported wire and carried to ground at intervals along the line of road.

The hanger comprises a rigid frame which is made in two parts or halves, each part composed of an upright bar $d$ having two horizontal branches $e$, $e$, the lower end of the bar $d$ being curved inward and upward to form a supporting arm $m$ having at its end a threaded projection $n$. Opposing branches $e$ of the two bars $d$ are connected together by means of blocks $f$ of strain insulating material, thereby forming two rigid cross bars between the two upright bars and serving to insulate one half of the hanger from the other half.

The bars $d$ are supported from the messenger wires $b$ in the following manner. The upper end of each bar $d$ is widened to form a seat $g$ which is dovetailed to receive a cap $h$, the cap being slid upon the seat in the direction of extension of the messenger wire. The cap and seat are provided with complementary recesses to form a cavity $i$ of greater diameter than the messenger wire and end openings $j$ of just sufficient diameter to permit the messenger wire to extend therethrough. The cap $h$ is provided with an orifice $k$ through which any suitable binding metal may be poured to fill the space in the cavity $i$ surrounding the messenger wire, whereby the hanger is held in fixed relation to the wire and the maintenance of electrical contact between them insured.

The wires $c$ are supported upon the inwardly and upwardly curved ends $m$ of the bars $d$ in the following manner: On each threaded projection $n$ is screwed a cap $o$ carrying a plate $r$ (see Fig. 5) extending in the direction of extension of the wire $c$. Another plate $s$ is secured against the plate $r$; the upper ends of both plates, adjacent to their upper edges, being of a contour adapted to receive and hold the wire $c$. Wire-supporting means of this construction are known in the art.

In the construction described, the electric current passes from one wire $b$ through one half the hanger to one wire $c$, while the return current passes from the other wire $c$ through the other half of the hanger to the other wire $b$, this construction being adapted where an all-metal circuit is employed. The invention, however, is not limited in its application to a case where the two wires $c$ perform identical functions.

The moving device by which contact is made with the overhead wire construction, and through which the current is carried between the wires $c$ and the vehicle, is represented on Figure 3 as the overrunning type of double trolleys shown by the two-wheeled trolley $w$ running upon the wires $c$ which may be of any approved construction, as the same forms no part of the invention save as the same may be an element of a combination claimed, the two wheels of course being insulated from one another.

The current may be taken from one wire *c* and returned to the other wire *c* by means of the contact of overrunning trolley wheels *w* held in a frame or carrier and insulated from each other as shown on Figure 3. But the invention is not limited to use with overrunning trolley wheels.

By the foregoing construction, the messenger wires and trolley wires will be bound and held in a rigid relation with each other, by the hangers at short distances apart, and the two trolley wires will be spaced and held at a practically uniform and unvarying distance from each other throughout their entire length by the same means, thus permitting continuous and simultaneous contact with both conductor wires by the trolleys or other means for making moving contact. The several hangers between any two poles or supports will be made of different heights so that with a given calculated sag in the messenger wires each trolley wire will be maintained throughout its length at or near the same level with each other at each point along the line and approximately parallel with the grade of the ground. This result is secured with the greatest practical length of spans between poles. By reason of the form and nature of the construction arising from the holding of all of the members with practical rigidity in separate and fixed position from each other at each hanger point, forming a compound lateral truss, the tendency to swaying of the wires is greatly reduced and indeed almost entirely eliminated, the tendency to sag in the conductor wires is minimized and equally distributed, and whether or not there is a variation of level in the two conductor or trolley wires at different points in the span to conform with the grade of the ground, the two conductor wires will be maintained at the same level with each other at any given point.

In addition to supporting the conductor or service wires, the catenary or messenger wires or cables and the hangers may also be used to support feeder or other wires or safety shield or guards.

Having now fully described my invention, what I claim and desire to protect by Letters Patent is:

1. In an overhead construction for the transmission of electricity through traveling contactors to moving vehicles the combination of poles disposed along the line of way, supports extending from the poles, spans extending along the line of way and affixed to the supports and consisting of plural catenary supporting members and plural parallel supported working conductors and a rigid current carrying spacer hanger located within the span between the supports and attached to the catenary members and the working conductors by attaching means provided on the hanger and arranged transversely with the hanger and in line with the catenary members and working conductors, and the attaching means by which two of the plural catenary members and two of the supported working conductors are affixed to the spacer hanger being apart from each other and positioned in relation to each other as the angle points of a quadrangle, and similar rigid spacer hangers provided with quadrangularly positioned attaching means and attached to the catenary members and the working conductors and spaced at intervals within the span along the line of way between the supports and the upper two of the quadrangularly positioned attaching means of the different hangers varying in height above the lower two in conformity with the sag of the catenaries and the attaching means of the hangers with the working conductors positioned uniformly for presenting the working conductors in parallel relationship, substantially as described.

2. In an overhead construction for the transmission of electricity through traveling contactors to and from moving vehicles, the combination of a traveling contact holder carrying plural contactors electrically insulated from each other, poles disposed along the line of way, supports extending from the poles, spans extending along the line of way and mechanically affixed to and electrically insulated from the supports and consisting of plural catenary supporting members and plural parallel supported working conductors positioned below and supported from the catenary members at points within the spans and a spacer hanger located within the span between the points of support and arranged transversely with and attached to the catenary members and the working conductors and provided with attaching means arranged transversely with the hanger and in line with the catenary members and working conductors, the attaching means by which two of the plural catenary members and two of the supported working conductors are affixed to the spacer hanger being apart from each other and positioned in relation to each other as the angle points of a quadrangle, the said spacer hanger having upright sides, upper and lower cross bracing for rigidly bracing the sides to and with each other at positions near their upper and lower ends, and the hanger having a space between the lower ends of the sides and the lower cross bracing for the passage of the contactor holder, strain resisting material for physically connecting and electrically insulating parts of the hanger from each other, and similar rigid spacer hangers provided with insulation and with quadrangularly positioned attaching means, spaced at intervals within the span and having the upper two attaching means of the different hangers varying in height above the lower two in conformity with the catenaries and the attaching means for the working conductors positioned uniformly for presenting the working conductors in parallel relationship for co-operation with the plural contactors carried by the traveling contact holder.

In testimony of which invention, I have hereunto set my hand, at Philada., Penna. on this 6th day of October, 1916.

JAMES I. COMLY